(12) United States Patent
Chow

(10) Patent No.: US 6,246,380 B1
(45) Date of Patent: Jun. 12, 2001

(54) SYSTEM AND METHOD FOR ESTABLISHING A POINT TO POINT RADIO SYSTEM

(75) Inventor: Peter El Kwan Chow, Orlando, FL (US)

(73) Assignee: Tempress Network Systems, Inc., Orlando, FL (US)

( * ) Notice: Subject to any disclaimer, the term of this patent is extended or adjusted under 35 U.S.C. 154(b) by 0 days.

(21) Appl. No.: 09/140,295

(22) Filed: Aug. 25, 1998

(51) Int. Cl.$^7$ ..................................................... H01Q 1/36
(52) U.S. Cl. ......................... 343/897; 343/844; 343/893; 455/422
(58) Field of Search ................................ 343/897, 876, 343/893, 810, 844; 455/422, 426, 447, 454, 446, 62

(56) References Cited

U.S. PATENT DOCUMENTS

| | | | |
|---|---|---|---|
| 4,727,590 | 2/1988 | Kawano et al. | 455/33 |
| 4,742,530 | 5/1988 | Kawai | 375/4 |
| 5,111,534 | * 5/1992 | Benner | 455/447 |
| 5,258,771 | * 11/1993 | Praba | 343/895 |
| 5,923,303 | * 7/1999 | Schwengler | 343/853 |
| 5,960,349 | * 9/1999 | Chheda et al. | 455/446 |
| 6,035,219 | * 3/2000 | Brodie | 455/562 |
| 6,067,055 | * 5/2000 | Vaidyanathan | 343/844 |

FOREIGN PATENT DOCUMENTS

0429200 * 5/1991 (EP) .

OTHER PUBLICATIONS

Pharaon Urbain, A Digital Radio Relay System for Urban Areas, IEEE Transactions, on Communications, US, IEEE Inc., New York, vol. COM–22, No. 9, Sep. 1974, pp. 1226–1235, XP000758878.
International Search Report, mailed Jan. 13, 2000.
"Relationships for Three–Dimensional Modeling of Co–Channel Reuse", IEEE Transactions on Vehicular Technology, US, IEEE Inc., New York, vol. VT–34, No. 2, May 1985, pp. 63–68, XP000565116.
"Alcatel 9400UL: New Family of Urban Microwave Links", Communication ET Transmission, FR, Sotelec., Paris, vol. 16, No. 2, 1994, pp. 53–60, XP000450575.
Jun. 1998, "Vienna Agreement for European Harmonised Coordination"—János Grad and Zoltán Zsuffa.
1994, Recommendation ITU–R F. 1095 "A Procedure for Determining Coordination Area Between Radio–Relay Stations of the Fixed Service".

\* cited by examiner

Primary Examiner—Don Wong
Assistant Examiner—Ephrem Alemu
(74) Attorney, Agent, or Firm—Fulbright & Jaworski L.L.P.

(57) ABSTRACT

A system and method are disclosed for deploying a plurality of point-to-point receiver transmitter pairs such that the main beam of transmitting radio does not point directly at any receiving radio antenna other than the desired receiving antenna. A three dimensional lattice matrix deploying nodes in different horizontal planes and aligning the nodes such that nodes of a particular row of nodes do not point directly at one another is used. Accordingly, particular horizontal and vertical angles, ideally greater than ½ the main beamwidth, are used to align nodes of the lattice. Additionally, inter-nodal distances and polarization isolation are taught to improve mutual interference.

50 Claims, 2 Drawing Sheets

SYSTEM AND METHOD FOR ESTABLISHING A POINT TO POINT RADIO SYSTEM

BACKGROUND OF THE INVENTION

Before wireless high frequency point-to-point communication service can be provided on a mass basis in an area there must exist a deployment scheme that can support the planned service. Such a scheme must be able to deploy a large number of radio links, i.e., two way radio communication established through main beams of both transmitting and receiving antennas where the antenna gain is at its maximum in a given area such that the individual radio links do not significantly interfere with one another.

There are a number of parameters that determine the magnitude of such interference, such as the antenna gain in the path of the interference, the "hop" distance between interfering and interfered, polarization isolation and frequency channel separation. For example, interference is worst case where the interfering transmitting main beam is directed towards the interfered receiving main beam, somewhat less when the interfering main beam is directed toward the interfered receiving sidelobe, and even less when the interfering transmitting sidelobe is directed toward the interfered receiving sidelobe. Additionally, the interference decreases the farther apart, i.e., the greater the "hop" distance between the interfering and the interfered. Likewise, orthogonal polarization and frequency separation provide radiation in transmitting to receiving interference.

A good example of a deployment scheme is the cell structure currently in use for cellular wireless service. The cellular cell structure provides a model to show that the interference is controllable by frequency reuse and sectorization. Typically, in a cellular network, each set of frequencies is reused in every seventh cell, with each cell divided into three sectors.

Cellular networks are broadcast based such that a transmitter sends out signals into a designated area and any receiver within that area can pick up the signals, if properly tuned. Point-to-point radios work at a frequency, typically above 18 GHZ, where the wavelengths are short so that for effective communication the transmitter and receiver must be pointing essentially directly at each other, i.e., line of site. Such narrow beam transmission implies that the transmitters and receivers are all in fixed positions with respect to each other where their density is not great. Thus, in contrast to cellular systems, there is no need in point-to-point systems to "blanket" a given area with transmitted signals. This line of sight requirement has allowed point-to-point systems to be constructed without regard to each other. However, as the demand for point-to-point systems increases (because of their inherent higher data carrying capacity), interference between discrete systems will result when a particular receiver is within the radiation pattern of more than one transmitter.

Thus, a need exists in the art for a system and method for developing a deployment pattern for transmitter/receiver pairs so as to minimize interference while maximizing the frequency reuse pattern.

A further need exists for such a deployment system which can be replicated from location to location.

A further need exists for such a system in which not all of the transmitter/receiver pairs need be deployed at any time, but which will accommodate growth in any direction throughout the deployment region on a pre-approved basis.

A need exists for a deployment standard for high frequency radio transmission systems which will allow any transmitter/receiver pair to be added by any user at certain calculable points within a geographic region while still maintaining maximum effective coverage within that region.

SUMMARY OF THE INVENTION

These and other objects, features and technical advantages are achieved by a system and method in which a network node deployment structure is utilized to improve the mutual interference associated with densely deployed radio systems as well as to provide a small exclusion zone for any single link. Accordingly, a lattice matrix structure is used to control interference between transmitter/receiver pairs. In the ideal case, the lattice nodes would be multi-level, i.e., at alternating heights, perhaps on top of tall and medium height buildings respectively. Therefore, the preferred embodiment of the present invention provides dense radio deployment where nodes are disposed such that interference is present to all, is through antenna sidelobes only, thus significantly improving mutual interference.

In the preferred embodiment of the present invention, the angle $\alpha$ is the angle in the horizontal plane between adjacent antenna nodes on different planes (the high (H) plane and the low (L) plane) and the angle $\beta$ is the angle in the elevation or vertical plane between adjacent antenna nodes on different planes. The angle $\alpha$ may be equal to angle $\beta$ to reduce the complexity of implementing the lattice structure of the present invention while providing interference avoidance. Ideally, both angles are smaller than 5 degrees.

A key factor in increasing radio link density is to place radio links as closely together as possible, including the exclusion (radiation) zone of the transmitting antenna. The primary method for accomplishing the desired link density is to insure that the main beam of any transmitting radio antenna does not point directly at (or send its radiation pattern to) any receiving radio antenna other than the desired receiving antenna. Other factors, which are important in the placement transmitting and receiving radio antennas, are antenna polarization isolation and antenna sidelobe control.

The 3-dimensional lattice structure has the capability of keeping interfering radio links from pointing directly at one another. Thus, it is a technical advantage of this invention that the horizontal and vertical angles between antennas can be pre-calculated so as to allow for maximum density and minimum interference.

It is a further technical advantage of this invention that the angles, both horizontal and vertical, can be adjusted to accommodate various geometric constraints while still serving to maximize the coverage within a given geographic zone.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE INVENTION

Figure 1:
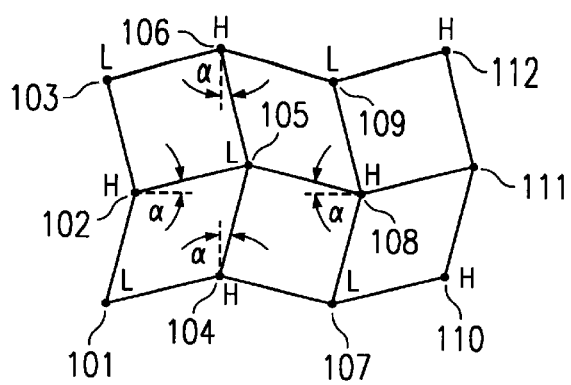
FIG. 1 shows a top down (horizontal plane) view of the lattice node structure of this invention.
Figure 2:
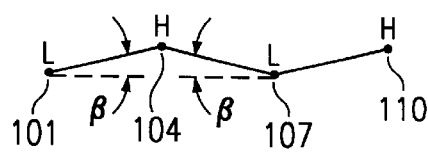
FIG. 2 shows a side (vertical plane) view of the lattice node structure.

Turning now to FIG. 1, there is shown the top down view of a three-dimensional lattice of the present invention in which adjacent nodes alternate between disposition in a high plane (H) and a low plane (L). Accordingly, nodes 101, 103, 105, 107, 109 and 111 are in the L plane and nodes 102, 104, 106, 108, 110 and 112 are in the H plane. For example, node 105 is Low (L) and next adjacent nodes 102, 104, 106 and 108 are high (H), whereas diagonal nodes 101, 103, 107 and 109 are also Low (L). Ideally, all of the high nodes are on the same plane and all of the low nodes are on the same plane although different such planes may be used. Typically, the angle $\alpha$ is the horizontal angle offset between adjacent antenna nodes (as shown in FIG. 1) and the angle $\beta$ is the vertical angle between adjacent antenna nodes on different planes (as shown in FIG. 2). Ideally, angle $\alpha$ is equal to angle $\beta$ to simplify the implementation of the lattice structure while avoiding interference.

As discussed, in FIG. 1, the horizontal angle between adjacent nodes is the angle $\alpha$ while, as shown in FIG. 2, the angle between adjacent nodes in the vertical direction, such as between nodes 101 and 102, is the angle $\beta$.

Figure 3:
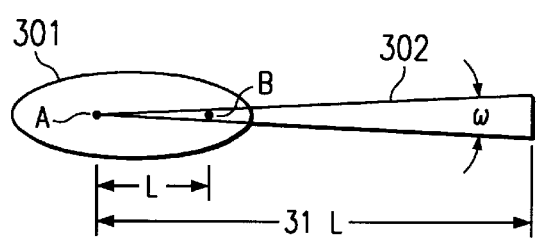
FIG. 3 shows the transmit signal zones of a typical node.

As with cellular radio networks, the number of radios in a point-to-point network that may be deployed in a given area is limited by interference from other radios operating on the same frequency. The point-to-point radio interference characteristic is as shown in FIG. 3, which shows radio A transmitting a signal to radio receiver B. Areas 301 and 302 are referred to as exclusion zones. For example, area 302 and 301 are where the interference from radio A would be too much for other receivers pointing in the direction of radio A and operating on the same frequency channel to function.

FIG. 3 also shows a typical relative size of the exclusion zones. The exclusion zones of FIG. 3 shows the worst case interference as the transmitting main beam to receiving main beam for a one frequency, same polarization, deployment. It should be appreciated that, in certain directions, zone 302 covers a very large area relative to the link dimension, L, between radios A and B and thus another receiver operating on a same channel and in line with radio A as receiver B should not be disposed in this transmission shadow.

The angles $\alpha$ and $\beta$ are selected with reference to the beamwidth (w) of the transmission exclusion zone. Ideally, $\alpha$ and $\beta$ should be larger than half the beamwidth of the antenna as measured in their respective planes. Normally beamwidth is measured at the 3 dB down points, however, the preferred embodiment of the present invention measures transmission null to null for determination of the angles $\alpha$ and $\beta$. Accordingly, if a is larger than half of the null to null beamwidth in the horizontal plane, there is no transmission horizontally to interfere with another node disposed in the same horizontal plane. Likewise, if $\beta$ is larger than half of the null to null beamwidth in the vertical plane, there is no transmission horizontally to interfere with another node in the same horizontal plane. This relationship is described in further detail with reference to FIG. 4A below.

It shall be appreciated that the exact value of angles $\alpha$ and $\beta$ can be adjusted for sidelobe radiation patterns. Moreover, the angles $\alpha$ and $\beta$ may not be consistent throughout the lattice, such as to adjust for differences in height and spacing between adjacent nodes due to terrain or for presence of signal anomalies, such as multipath or shadows. Since the radiation pattern of antenna may not be the same in the horizontal plane as it is in the vertical plane the angle $\alpha$ might be different from the angle $\beta$.

In better understanding the lattice structure of the present invention, the first step is to analyze the lattice in a horizontal plane. Shown in FIG. 4A, having the same lattice structure of FIG. 1 extended to include additional nodes, are two adjacent rows of nodes in a horizontal plane. It shall be appreciated from a review of FIG. 4A that avoidance of interference according to the present invention is two phase: angular and spatial. Accordingly, the angle $\alpha$ in the horizontal plane is selected not only such that only a desired adjacent node is within the antenna beam, but also such that a distance sufficient to avoid undesired interference is provided between any other nodes of the lattice which may fall along a vector associated with this antenna beam.

It shall be appreciated that the inter-nodal distance 1, in combination with the angle $\alpha$, affects this relationship. Accordingly, selection of the inter-nodal distance 1 may be utilized in combination with the selection of the angle $\alpha$ according to the present invention. For example, as shown above in FIG. 3, the transmission shadow of a particular point-to-point transmitter is typically thirty-one times the separation distance of the transmitter/receiver pair (this is typically because the transmitter power is adjusted to be sufficient to provide an acceptable signal at the receiver even during signal attenuating events such as rain fall). Accordingly, in an alternative embodiment, such as where the vertical angle $\beta$ is small or null, the angle $\alpha$ and the inter-nodal distance 1 are selected such that a second receiver is not disposed along a vector of a first transmitter/receiver link not associated with the second receiver within a distance 31(1) of the first transmitter.

Figure 4A:
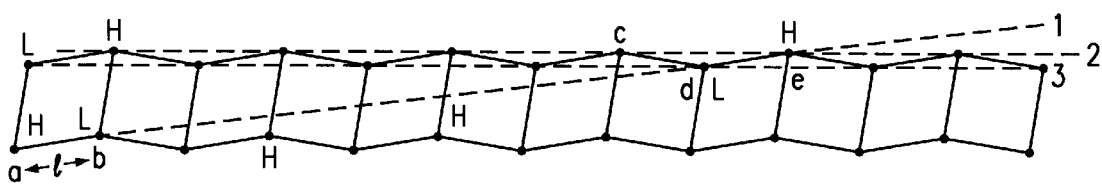
FIGS. 4A, 4B and 5 illustrate how, with the inventive layout of nodes, interference will not occur.

The relationship of selection of the angle $\alpha$ and the inter-nodal distance 1 is better understood with reference to the nodes illustrated in FIG. 4A. Link ab from node a to node b will be used for interference analysis. Line 1 is a vector extending from the link ab. Where the angle $\alpha$ is properly selected, only the desired two main antenna beams, shown here as transmitter/receiver pair a/b, will point at each other within a selected distance of link ab. Specifically, the main antenna beams of nodes of a same row or column, as illustrated in FIG. 4A, will not point at each other as long as the angle from the center of the main beam to the first sidelobe is less than $\alpha$.

Additionally, by applying the angle $\alpha$ to direct the vector associated therewith in alternate directions for ones of the nodes, an alternating pattern, as shown in FIG. 4A, is produced. Accordingly, although one node of the transmitter/receiver pair c/d is disposed along the vector of link ab, line 1, the transmitter/receiver pair c/d utilize a link cd (from node c to node d) having an angle $2\alpha$ from line 1 because of the angle $\alpha$ associated with link ab and the angle $\alpha$ associated with link cd. It should be appreciated from a review of FIG. 4 that this non-alignment of antenna beams through alternate application of the angle α holds true for all H to L links, i.e., no H node to L node link aligns with another H node to L node link, and for all L to H links, i.e., no L node to H node link aligns with another L node to H node link.

It shall be appreciated that, although transmitter/receiver pair d/e are disposed along the vector of link ab, line 1, the d/e transmitter/receiver pair are disposed a substantial distance from the a/b transmitter/receiver pair. Accordingly, through proper selection of the angle α and inter-nodal distance 1, no other transmitter/receiver pair is in the exclusion pattern of the ab link, nor will the a/b pair be within the exclusion zone of a third beam. Moreover, as will be fully appreciated from the discussion below, link de is a L to H link whereas link ab is a H to L link.

Figure 5:
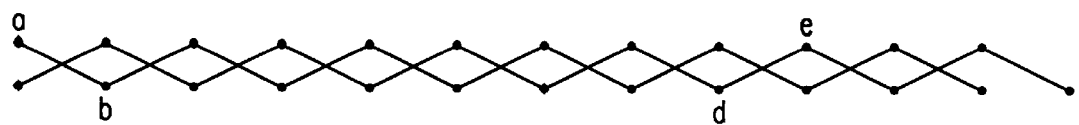

The lattice structure of the present invention provides for the use of the angle β in the vertical plane to provide nodes alternating between a L and H horizontal plane. Accordingly, line 1, emanating from node a in the H plane and directed to node b in the L plane (therefore directed down as shown in FIG. 5), would not even intersect node d disposed in the L plane or node e disposed in the H plane, as long as β is selected such that no portion of the antenna main beam transmission is at the horizontal level from a to d or e. Therefore, although link ab appears to have main beam interference with link de in the horizontal plane (provided the transmission shadow of node a were sufficiently long), there is no such interference because of the alternate application of the angle β in the vertical plane. Accordingly, discrimination, in addition to the distance between transmitter/receiver pairs a/b and d/e, is provided according to the present invention.

It shall be appreciated that the use of the three dimensional lattice, including the α and β angles described above, allows for reuse of a transmitter/receiver pair operating on a same channel with substantially less separation there between than the full length of the transmission shadow. Moreover, through the use of different frequencies, i.e., assigning different channels to ones of the transmitter/receiver pair, in combination with the above described lattice structure utilizing the angles α and β allows for transmitter/receiver pairs utilizing different ones of the channels to be interleaved in order to provide denser coverage and/or more desirable signal conditions (better signal to noise, reduced co-channel interference, etc.).

Figure 4B:
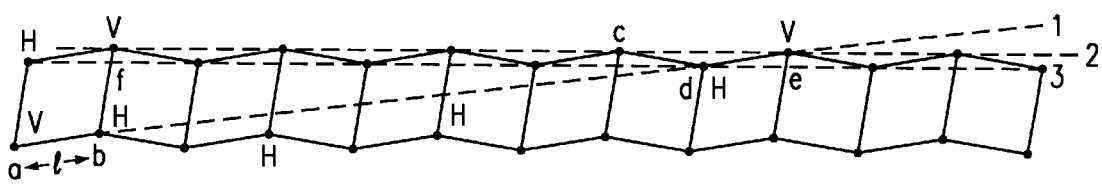
Figure 6:
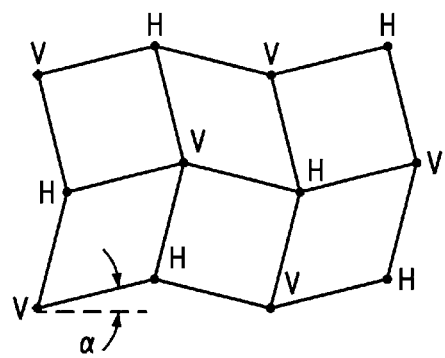
FIG. 6 shows the polarization assignment for the nodes.

An additional reduction in interference is possible using both vertical and horizontal (or other orthogonal or substantially orthogonal) polarization in the propagation for the reason that each antenna designed to receive one polarization will receive less energy having a different polarization. FIG. 6 shows a preferred embodiment alternating the transmitter polarization assignment (note that the transmitter and intended receiver parts are to always employ the same polarization). H and V represent the horizontal and vertical polarization respectively. Mapping the polarization assignment on FIG. 4A as shown in FIG. 4B, the interference node a to node f must be from a sidelobe of node a having a vertical polarization transmitter to a sidelobe of node f having a horizontal polarization receiver. This alternating polarization further reduces the mutual interference experienced between the two nodes. Node a and node e might interfere with each other through main beams when node a and node e are on a two-dimensional antenna placement and their power/gain are sufficient to communicate over the "hop" distance. However, the alternating polarization will provide the receiver at node e with a different polarization than that of node a's transmitter. So additional mutual isolation is also provided between these nodes which might otherwise experience undesirable levels of interference through polarization.

The above described implementation of the lattice of the present invention ensures the sum of interference from all radios in the network as perceived by any one of the radios is low enough to permit its functioning properly. This result is due substantially to the ability of the three dimensional lattice of the present invention deploying transmitter/receiver pairs such that the main-beam of other such transmitter/receiver pairs cannot directly interfere.

Excluding main-beam, interference has another effect of simplifying point-to-point radio network deployment. The optimization of interference and signal path can be done independently. For example, the signal path of every link can be optimized substantially without the concern of interference, i.e., the transmit power of a particular transmitter may be increased to provide desired signal conditions at the associated receiver without concern of substantially increasing the interference at other such receivers. Antenna sidelobe magnitude, polarization isolation and radio separation in distance are the design parameters for interference control, however the lattice structure of the present invention has already taken these parameters into consideration for the particular radiation characteristics of the transmitters and receivers.

Figure 7:
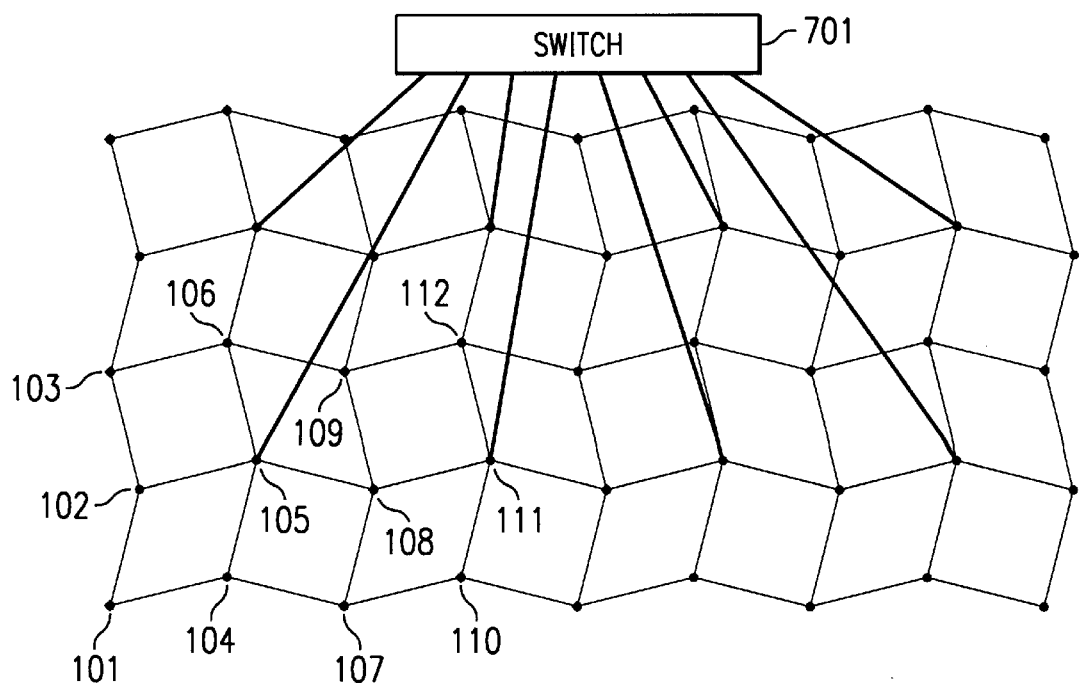
FIG. 7 shows the node structure connected to a switch for intercommunication and for communication with the public switched (or private) communication network.

Directing attention to FIG. 7, a further advantage of the lattice structure of the present invention may be seen. Here switch 701 is coupled to nodes of the lattice. Switch 701 may be a public switched network (PSN), a fibre optic backbone, or other such link providing intercommunication between nodes of the lattice and nodes external thereto (not shown). Moreover, switch 701 may provide communication between ones of the nodes of the lattice, such as to provide additional bandwidth where point-to-point links there between are at or near capacity, or where a link or links have failed, such as where a particular node is out of service. Regardless of the use to which switch 701 is put, it shall be appreciated that nodes of the lattice may establish communication with, or through, switch 701 through at most two point-to-point links. Moreover, through coupling switch 701 to slightly more nodes of the lattice, each node may establish communication with, or through, switch 701 through at most one point-to-point link. Accordingly, resources may be made available to nodes of the lattice very efficiently as independent connection to such resources is not required.

Although described above as a single angle α, associated with the horizontal plane, and a single angle β, associated with the vertical plane, the lattice of the present invention may utilize a plurality of either of such angles to provide flexibility in deploying the structure in environments including terrain differences or other obstacles such as buildings or to provide more dense deployment of transmitter/receiver pairs in one area of the lattice as compared to that of another part of the lattice. For example, in a metropolitan area where the nodes of the lattice are desired to be more densely deployed, i.e., inter-nodal distance 1 is small, the angle β may be selected to be more acute for this area while being less acute for a more suburban area.

Although the present invention and its advantages have been described in detail, it should be understood that various changes, substitutions and alterations can be made herein without departing from the spirit and scope of the invention as defined by the appended claims.

What is claimed is:

1. A point-to-point radio network comprising:
a plurality of substantially directional node antennas disposed at predetermined positions to form a predefined structure of node antennas, wherein a directional node antenna disposed at each predetermined position of said predetermined positions is directed along a vector different than each corresponding adjacent directional node antenna of said structure of node antennas, wherein a difference in the vector of each said directional node antenna disposed at a predetermined position of said predetermined positions and the vector of a plurality of said adjacent directional node antennas of said structure of node antennas is a horizontal angle, and wherein a difference in the vector of each said directional node antenna disposed at a predetermined position of said predetermined positions and the vector of each said adjacent directional node antenna of said structure of node antennas is a vertical angle.

2. The network of claim 1, wherein said predefined structure of the node antennas is a lattice structure.

3. The network of claim 1, wherein the directional node antenna disposed at each predetermined position of said predetermined positions is substantially orthogonally polarized with respect to each corresponding adjacent directional node antenna of said structure of node antennas.

4. The network of claim 1, wherein a transmission pattern from the antennas at each node is such that a main beam intersects with only one other antenna node of said system, wherein intersection of other ones of said antenna nodes is avoided at least in part through selection of said difference between said vectors and an internodal distance of structure of said node antennas.

5. The network of claim 1, wherein said structure provides a predetermined desired density of node antennas.

6. The network of claim 5, wherein said predetermined desired density of node antennas provided by said structure is increased by disposing additional substantially directional node antennas at predetermined positions within said structure to thereby provide a more dense structure.

7. The network of claim 1, wherein a difference in the vector of said directional node antenna disposed at each predetermined position of said predetermined positions and the vector of a plurality said corresponding adjacent directional node antennas of said structure of node antennas is a horizontal angle.

8. The network of claim 7, wherein said horizontal angle is selected as a function of a horizontal beamwidth of said directional node antennas.

9. The network of claim 8, wherein said horizontal beamwidth is measured from null to null.

10. The network of claim 8, wherein the vector of each of said directional node antennas disposed at a predetermined position of said predetermined positions has a vectorial angle which is offset from a rectangular coordinate system an angle greater than ½ the horizontal null to null beamwidth of said directional node antennas.

11. The network of claim 1, wherein a difference in the vector of each said directional node antenna disposed at a predetermined position of said predetermined positions and the vector of each said adjacent directional node antenna of said structure of node antennas is a vertical angle.

12. The network of claim 11, wherein said vertical angle is selected as a function of a vertical beamwidth of said directional node antennas.

13. The network of claim 12, wherein said vertical beamwidth is measured from null to null.

14. The network of claim 12, wherein the vector of each of said directional node antennas disposed at a predetermined position of said predetermined positions has a vectorial angle which is offset from a rectangular coordinate system an angle greater than ½ the vertical null to null beamwidth of said directional node antennas.

15. A point-to-point radio transmission system having a plurality of antenna nodes arranged into a matrix formulation such that nodes adjacent to each other are at differing heights, wherein an angle associated with the differing heights of adjacent antenna nodes is a preselected angle β, wherein angle β is greater than ½ of the beamwidth of a main beam of said directional node antenna at the respective nodes.

16. The system of claim 15, wherein the matrix formulation further includes nodes adjacent to each other being offset a preselected angle α, and wherein angle α is substantially equal to angle β.

17. The system of claim 15, wherein the antenna transmission at each node is polarized in a different direction than corresponding antenna transmission at each said adjacent node.

18. The system of claim 15 wherein said antennas at each said node operate at a frequency above 18 GHz.

19. The system of claim 15, wherein a transmission pattern from the antennas at each node is such that a main beam intersects with only one other antenna node of said system.

20. The system of claim 15, wherein said different heights are substantially two different heights, and wherein antenna nodes of a row of antenna nodes of said matrix formulation alternate between a first height and a second height of said two different heights.

21. The system of claim 20, wherein antenna nodes of a column of antenna nodes of said matrix formulation also alternate between said first height and said second height of said two different heights.

22. The system of claim 15, wherein the matrix formulation further includes nodes adjacent to each other being offset a preselected angle α.

23. The system of claim 22, wherein antenna nodes of a row of antenna nodes of said matrix formulation alternate between a positive offset of said angle α and a negative offset of said angle α.

24. The system of claim 23 wherein antenna nodes of a column of antenna nodes of said matrix formulation also alternate between a positive offset of said angle α and a negative offset of said angle α.

25. A point-to-point radio transmission system having a plurality of antenna nodes arranged into a matrix formulation such that a first node is offset a preselected angle with respect to a line intersecting a second and third node each of which is adjacent to and in a same matrix column as said first node and said first node is offset said preselected angle with respect to a line intersecting a fourth and fifth node each of which is adjacent to and in a same matrix row as said first node.

26. The system of claim 25, wherein said preselected angle is greater than ½ of the beamwidth of a main beam of said node antenna at the respective nodes.

27. The system of claim 25, wherein the antenna transmission at each node is polarized in a different direction than a corresponding antenna transmission at each said adjacent node.

28. The system of claim 25, wherein antenna nodes of a row of antenna nodes including said first node, said second node, and said third node of said matrix formulation alternate between a positive offset of said preselected angle and a negative offset of said preselected angle.

29. The system of claim 28, wherein antenna nodes of a column of antenna nodes including said first node, said fourth node, and said fifth node of said matrix formulation also alternate between a positive offset of said preselected angle and a negative offset of said preselected angle.

30. The system of claim 25, wherein each of said second node, said third node, said fourth node, and said fifth node are disposed at a different elevation than said first node.

31. The system of claim 30, wherein said first node is disposed in a first horizontal plane and each of said second node, said third node, said fourth node, and said fifth node are disposed in a second horizontal plane.

32. The system of claim 31, wherein nodes other than said first node adjacent to each of said second node, said third node, said fourth node, and said fifth node are also disposed in said first horizontal plane.

33. The system of claim 31, wherein an angle associated with a node of said first horizontal plane and an adjacent node of said second horizontal plane is said preselected angle.

34. A point-to-point radio transmission system having a plurality of antenna nodes arranged into a matrix formulation such that nodes adjacent to each other are at alternating elevations and such that a first node is offset a preselected angle with respect to a line intersecting a second and third node each of which is adjacent to said first node and said first node is offset said preselected angle with respect to a line intersecting a fourth and fifth node each of which is adjacent to said first node.

35. The system of claim 34 wherein said alternating elevations are selected such that an angle β associated with the direction of a main transmission antenna beam of each antenna node is greater than ½ of a beamwidth of said main beam.

36. The system of claim 34, wherein said offset is selected such that an angle α associated with the direction of a main transmission antenna beam of each antenna node is greater than ½ of a beamwidth of said main beam.

37. The system of claim 34, wherein a transmission antenna beam of said first antenna node is polarized orthogonal to a transmission antenna beam of each of said second, said third, said fourth, and said fifth nodes.

38. A method of establishing a point-to-point microwave antenna system, said method comprising the steps of:

determining a main beamwidth of each antenna in said system;

placing said antennas at positions within said system so that adjacent antennas are at different heights, the heights selected such that the vertical angle between said adjacent antennas is greater than ½ the determined beamwidth.

39. The method of claim 38, wherein said positions of said placing step are substantially equidistant as between antennas of a row of antennas and as between antennas of a column of antennas.

40. The method of claim 38, wherein said determining step comprises the step of:

determining outer nulls associated with said main beam, wherein said beamwidth is measured with respect to said outer nulls.

41. The method of claim 38, wherein said placing step comprises the step of:

adjusting said antennas within said system so that antennas of a row of antennas alternate their direction of radiation and so that antennas of a column of antennas also alternate their direction of radiation.

42. The method of claim 38, further comprising the step of:

polarizing said antennas of said system so that alternate adjacent ones of said antennas are orthogonally polarized.

43. A method of establishing a point-to-point microwave antenna system, said method comprising the steps of:

determining a main beamwidth of each antenna in said system;

disposing said antennas within said system so that corresponding antennas of a row of antennas alternate their direction of radiation and so that corresponding antennas of a column of antennas also alternate their direction of radiation, wherein alternation of said direction is a function the determined beamwidth, and positioning said antennas so that adjacent antennas are at different heights, wherein the direction of radiation of each adjacent antenna alternates in correspondence to the difference in heights.

44. The method of claim 43, wherein the different heights are selected such that the angle between said adjacent antennas is greater than ½ the determined beamwidth.

45. The method of claim 43, further comprising the step of:

polarizing said antennas of said system so that alternate adjacent ones of said antennas are orthogonally polarized.

46. The method of claim 43, wherein said antennas disposed as in said disposing step are substantially equidistant as between antennas of a row of antennas and as between antennas of a column of antennas.

47. The method of claim 46, wherein said determining step comprises the step of:

determining outer nulls associated with said main beam, wherein said beamwidth is measured with respect to said outer nulls.

48. A point-to-point radio network comprising:

a plurality of substantially directional node antennas disposed at predetermined positions to form a predefined structure of node antennas, wherein a directional node antenna disposed at each predetermined position of said predetermined positions is directed along a vector different than each corresponding adjacent directional node antenna of said structure of node antennas, wherein a difference in the vector of said directional node antenna disposed at each predetermined position of said predetermined positions and the vector of a plurality said corresponding adjacent directional node antennas of said structure of node antennas is a horizontal angle, wherein said horizontal angle is selected as a function of a horizontal beamwidth of said directional node antennas, wherein the vector of each of said directional node antennas disposed at a predetermined position of said predetermined positions has a vectorial angle which is offset from a rectangular coordinate system an angle greater than ½ the horizontal null to null beamwidth of said directional node antennas.

49. A point-to-point radio network comprising:

a plurality of substantially directional node antennas disposed at predetermined positions to form a predefined structure of node antennas, wherein a directional node antenna disposed at each predetermined position of said predetermined positions is directed along a vector different than each corresponding adjacent directional node antenna of said structure of node antennas, wherein a difference in the vector of each said directional node antenna disposed at a predetermined position of said predetermined positions and the vector of each said adjacent directional node antenna of said structure of node antennas is a vertical angle, wherein said vertical angle is selected as a function of a vertical beamwidth of said directional node antennas, wherein the vector of each of said directional node antennas disposed at a predetermined position of said predetermined positions has a vectorial angle which is offset from a rectangular coordinate system an angle greater than ½ the vertical null to null beamwidth of said directional node antennas.

50. A point-to-point radio network comprising:

a plurality of substantially directional node antennas disposed at predetermined positions to form a predefined structure of node antennas, wherein a directional node antenna disposed at each predetermined position of said predetermined positions is directed along a vector different than each corresponding adjacent directional node antenna of said structure of node antennas, wherein a transmission pattern from the antennas at each node is such that a main beam intersects with only one other antenna node of said system, wherein intersection of other ones of said antenna nodes is avoided at least in part through selection of said difference between said vectors and an internodal distance of structure of said node antennas.

* * * * *

UNITED STATES PATENT AND TRADEMARK OFFICE
CERTIFICATE OF CORRECTION

PATENT NO.    : 6,246,380 B1                                  Page 1 of 1
DATED         : July 6, 2001
INVENTOR(S)   : Peter El Kwan Chow It is certified that error appears in the above-identified patent and that said Letters Patent is hereby corrected as shown below:

**Assignee: Triton Network Systems, Inc.
Orlando, FL (US)**

Signed and Sealed this

Eighteenth Day of September, 2001

*Attest:*

*Attesting Officer*

NICHOLAS P. GODICI
*Acting Director of the United States Patent and Trademark Office*